March 30, 1937.  A. LINDNER  2,075,213
ARTICLE COVERING MACHINE
Filed Feb. 23, 1934  6 Sheets-Sheet 6

INVENTOR
Arthur Lindner
BY C. A. Goepel.
his ATTORNEY

Patented Mar. 30, 1937

2,075,213

UNITED STATES PATENT OFFICE 2,075,213

ARTICLE COVERING MACHINE

Arthur Lindner, Brooklyn, N. Y.; Oscar A. Lindner and Aurelie Muller, executors of Arthur E. Lindner, deceased, assignors to The L. & H. Special Machine Co. Inc., Brooklyn, N. Y., a corporation of New York Application February 23, 1934, Serial No. 712,447

18 Claims. (Cl. 66—1)

My invention relates to a machine for covering articles or cores and for the purpose of showing the utility of the invention I shall herein illustrate and describe the same in connection with the manufacture of covered finger-pieces or rings of the kind commonly attached to the pull cords of window shades.

I desire to make it understood that in showing and describing one application and use of my invention, I have not intended to limit the broader aspects of the invention to a machine adapted for the purpose indicated. The machine involves principles of general application which may be variously adapted and modified for covering and ornamenting articles of different kinds, not only of ring-shaped cores or pull pieces for window shades, but also other articles of various designs and shapes and having other and different uses, and therefore it is my intention to cover in some of the broader claims hereunto appended, these principles in any modification, of construction, design and function and interconnection in which they may be embodied, as well as to cover the particular adaptation of such principles herein specifically illustrated and described.

An object of my invention is the provision of a machine of the character described embodying certain desired features of simplicity and convenience and which will function automatically to encase a ring-shaped core or the like by covering the same with cord or thread windings consisting of fabric material or the like, and further to encase the core after the fashion of woven work, stitch connecting or interlocking the cord convolutions to make a substantial, durable covering of an ornamental character.

A further object of the invention is the provision of a machine which is adapted to use cords, threads or the like of different sizes and gauges for the covering of cores and similar articles.

More particularly considered, the machine of the present invention for the performance of the functions and the accomplishment of the results herein contemplated, involves coacting and cooperating mechanisms and parts as follows: cord-applying and stitching mechanism which includes a well-known type of latch needle implement having a hook and pivoted latch; looper mechanism for carrying cord, forming loops and presenting the same to the needle hook; loop stripping mechanism for the needle; work feeding mechanism; a stop motion control whereby automatically to predetermine the number of convolutions and stitch connections; and other combined parts and mechanisms having to do, in the manner as hereinafter set forth, with automatic operation, control and precision, and devised to facilitate the manufacture of covered articles by operators possessing only ordinary skill in such matters.

The nature of the general principles above referred to, as well as other and additional objects and advantages which will become apparent as the description proceeds, and the manner in which as an example they may be embodied in concrete form and means are explained in the following detailed description of the simple and practical embodiment herein illustrated: and the invention resides in the construction, combination and relative arrangement of parts hereinafter described and claimed.

In the accompanying drawings, wherein I have disclosed one practical embodiment of the several novel features of my invention and wherein similar reference characters designate corresponding parts throughout the several views:—

Figs. 12 to 20, inclusive, are fragmentary detailed views, generally progressive in character, showing how the cord convolutions are produced on the core and stitched thereon by chain stitches. Of these, Figs. 12 and 13 show the parts in the position in which a loop may be gathered when the needle is above the work, Fig. 12 being a vertical section on the line 12—12 of Fig. 13, and Fig. 13 being a sectional plan on the line 13—13 of Fig. 12. Figs. 14 to 16 show the steps involved in producing a chain stitch. Figs. 18 to 20 show the steps involved in gathering a stitch below the work, Fig. 19 being a sectional plan on the line 19—19 of Fig. 18.

Fig. 21 is a plan view of a ring-shaped core partially covered with chain stitched cord windings and showing also the loop continuation of the cord by means of which the pull piece may be suspended from a window shade.

In the following description of the disclosed machine the construction and general operation of the various mechanisms will be treated separately, after which the description will proceed with the coaction and cooperation of the mechanisms for covering a core. The body or framework of the machine of the disclosure is similar to that of an ordinary sewing machine; but this is not essential as the working parts may be supported in any suitable or approved framing or construction. The core piece disclosed herein and which is to be covered is in the form of a ring or washer of the type commonly employed as the core or foundation member for the pull ring of a window shade. This is not essential, as the machine in its broad aspect is adapted to cover cores of various forms and shapes, as well as other articles having various forms and shapes. While the covering cord shown in the drawings is of relatively large size because it is also intended for use as a pull cord connection for window shades, it will be understood that the coacting mechanisms of the machine are adapted to function to cover cores or articles with cord of various sizes and also with threads.

Figure 1:
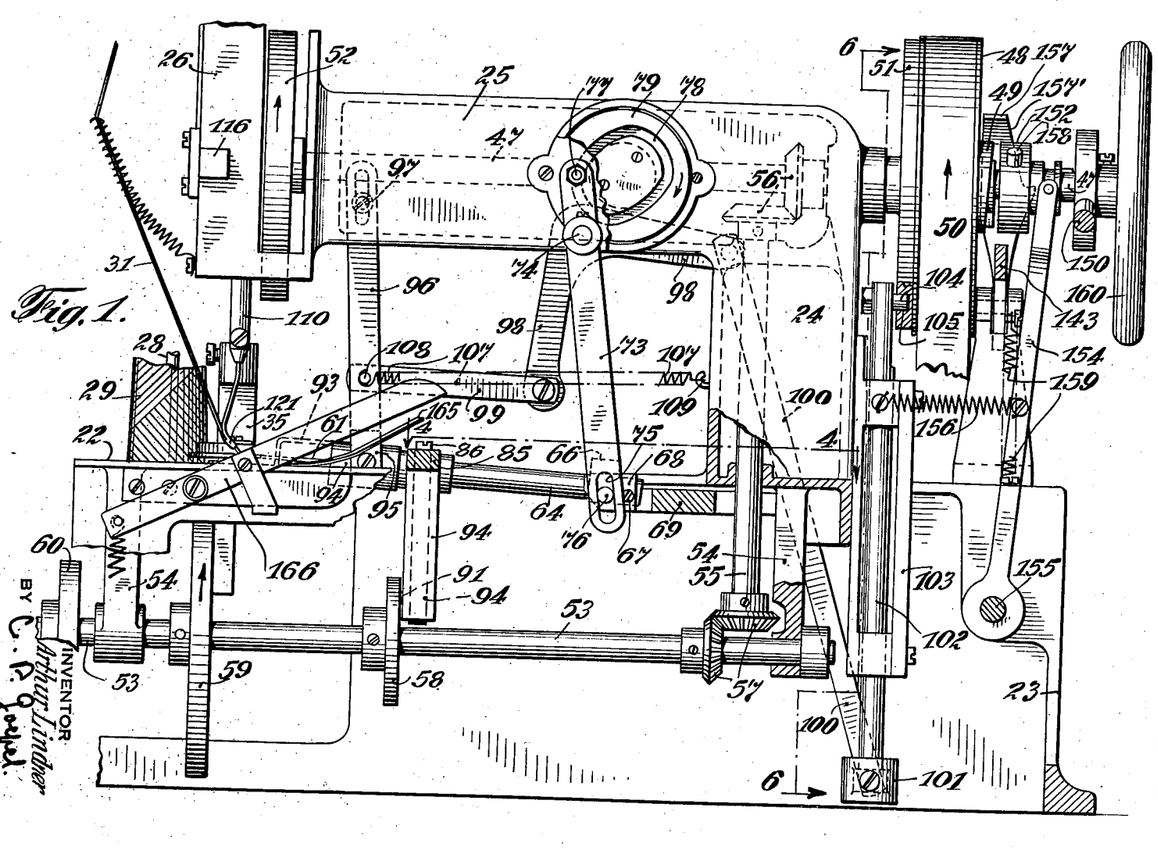
Figure 1 is a fragmentary side elevational view, partly in section, of a machine embodying the present invention, this view being taken substantially on the line 1—1 of Figure 3.
Figure 2:
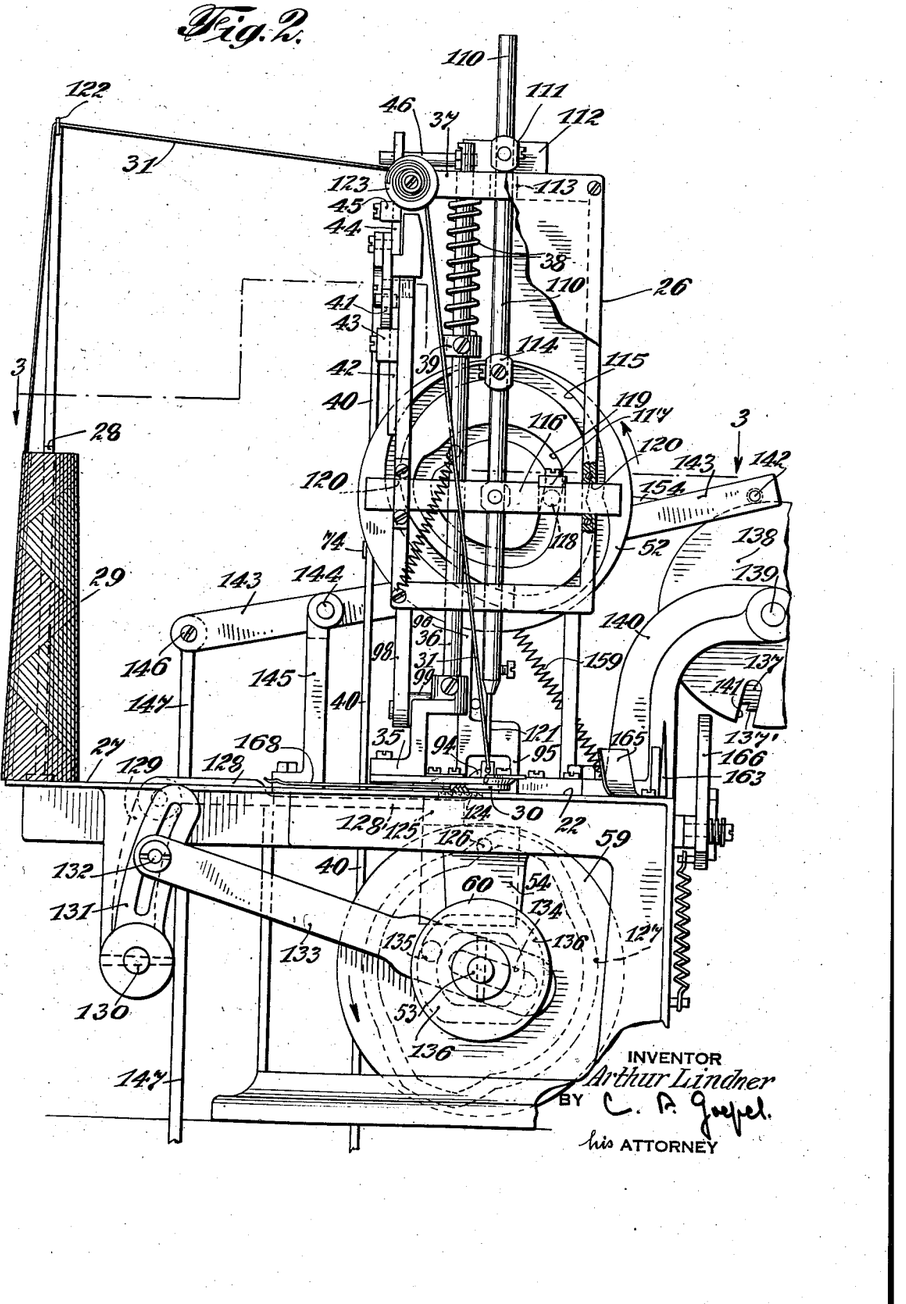
Fig. 2 is an elevational view of the lefthand end, or head end, of the machine shown in Fig. 1, parts being broken away and parts being shown in section.

Referring now in detail to the accompanying drawings, I show for the purpose of illustrating how the various mechanisms and working parts involved in my invention may be suitably supported and interconnected for carrying out the functions and advantages of the invention, a typical sewing machine framework comprising a bed plate or work table 22 supported upon a hollow base 23 adapted to rest upon or to be secured to a work table, bench or the like. Rising from the bed plate adjacent the right-hand or rear end thereof, as viewed in Fig. 1, is an upright standard 24 which supports an overhanging arm 25 the front or left-hand end of which is provided with a head 26. Mounted upon a suitable rear extension 27 adjacent the front or left-hand end of the bed plate is a vertical spindle 28 on which is disposed a bobbin 29 which carries the supply of fabric covering material. In the present instance, the fabric material shown on the bobbin consists of a relatively thick endless cord or strand of the kind commonly employed as a pull cord for window shades; the illustrated application of the invention being a showing of how an article in the form of a ring-shaped core or tassel ring 30 may be covered with chain-stitched convolutions of the fabric cord which is denoted in general by the numeral 31.

Below the overhanging arm 25, the bed plate 22, for the accommodation of working parts, is provided with a longitudinally extending opening 32 which below the head 26 is in open communication with a throat plate 33 which in the present instance includes an upstanding circularly formed flange or collar 34 around which the tassel ring 30 is disposed as best shown in Figs. 7 to 11, inclusive. The exterior diameter of said upstanding throat plate flange 34 is much less than the interior diameter of the tassel ring 30 in order that the latter can be readily moved or fed circularly for the cord covering operation. 35 denotes a presser foot plate which is attached to the lower end of a vertically disposed presser foot plate bar 36 the upper end of which is slidably engaged in a suitable opening in the head top plate 37. By means of an expansion spring 38 imprisoned between the top plate 37 and a collar 39, said bar is normally urged downwardly to contact and engage the presser foot plate 35 with the top edge of the upstanding throat plate flange 34. For the application and removal of tassel rings from the throat plate or holder 33, means are provided whereby through a foot-treadle (not shown) or the like, the presser foot may be elevated against the tensioning of the spring 38, and such means are herein represented as comprising a foot-treadle connecting rod 40 attached at its upper end to a throw-lever 41 carried by plate 42 adjustable in a guide 43 and connected with a pull member 44 slidable in a guide 45, which pull member adjacent its upper end is connected with a horizontal arm 46 attached to the upper end of the presser foot plate bar 36. By drawing the connecting rod 40 downwardly (through the actuation of the foot-treadle) the presser foot plate may be elevated to permit the application or removal of a tassel ring.

Disposed within the overhanging arm 25 and in suitable bearings provided therein for the purpose is the main driving shaft 47 the right-hand end of which extends well beyond the upright standard 24 and carries a loose pulley 48 with which is connected a clutch part 49. Engaged with the pulley 48 is a driving belt 50 which is operated from any suitable source of power as, for instance, from an electric motor (not shown). Also attached to the pulley 48 is a disk cam 51. The opposite end of the main shaft 47 extends into the head 26 where it carries a disk cam 52. A second shaft 53, which is parallel with the main shaft 47, is located below the bed plate and mounted in suitable bearings provided in arms 54 depending from the bed plate. This second shaft 53 receives its motion from the main shaft 47 through means comprising a vertically disposed shaft 55, a pair of upper bevel gears 56 and a pair of lower bevel gears 57. Upon the shaft 53 are mounted three separate disk cams, 58, 59, and 60, the purposes and functions of which will be hereinafter explained.

Figure 4:
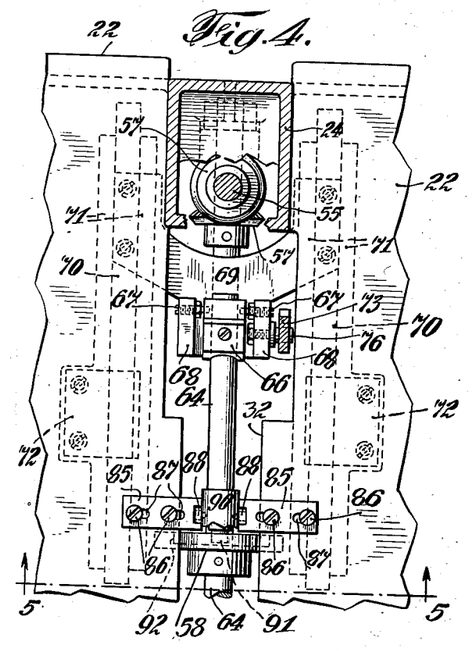
Fig. 4 is a detailed horizontal section taken on the line 4—4 of Fig. 1.
Figure 5:
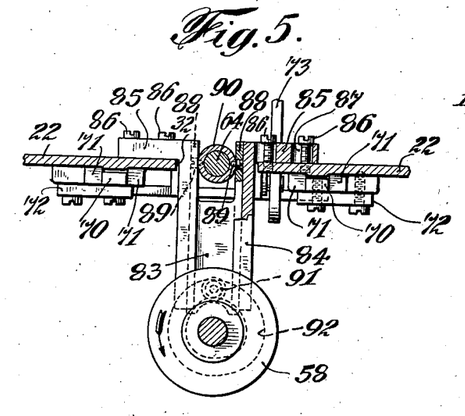
Fig. 5 is a detailed vertical section taken on the line 5—5 of Fig. 4.

The strand or cord applying and stitching mechanism includes a latch needle 61 having a hook 62 and a pivoted latch 63. This latch needle is supported by a carrier shaft 64, a simple mode of detachably and adjustably connecting the latch needle with the carrier shaft consisting in inserting the shank of the latch needle into an axial opening in the front end of the shaft and applying thereto a set screw 65 adapted to secure the latch needle in the opening in the desired adjusted position. The shaft 64 has applied thereto at or near its rear end a supporting block or bushing 66 which in turn is pivotally supported by trunnions 67 mounted in lugs 68 upstanding from a cross-head slide 69 the opposite ends of which are attached to slide rails 70 disposed for longitudinal reciprocation in guideways composed of oppositely disposed guide rails 71 and connected bottom plates 72, it being noted from Figs. 1, 4 and 5 that the needle carrier and its associated parts are accommodated in the longitudinal opening 32 while the opposite ends of the cross-head slide 69 extend underneath the bed plate where the slide rails 70 are disposed, the guide rails 71 and connected bottom plates 72 being secured in place to the underneath side of the bed plate. The carrier shaft 64 and consequently the latch needle supported thereby are reciprocated in the direction of their length, and the transmission means by which this reciprocation is effected from the main shaft 47 consists in the provision of a lever 73 which is fulcrumed to swing on a stud pin 74 secured transversely in the overhanging arm 25. The lower end of the lever 73 has a lost-motion connection with the block 66 by means of an elongated slot 75 and a pin 76 on said block which engages in this slot. At its upper end, the lever 73 carries a follower roller 77 which is in engagement with a cam slot 78 provided in the face of disk cam 79. A stud 80 suitably supported by the overhanging arm supports the disk cam 79 for rotation and rigid with the disk cam 79 is a bevel gear 81 which is in mesh with a bevel gear 82 applied to the main shaft 47. Under this arrangement, longitudinal reciprocating motion is imparted to the carrier shaft 64 from the rotary motion of the main shaft 47 and in connection with this reciprocating motion the carrier shaft is adapted to be given vertical oscillation due to the trunnion connections between the bushing 66 and the cross-head slide 69.

Motion is taken from the disk cam 58 for reciprocating the carrier shaft 64 vertically up and down, that is to say, in a direction transversely of the lengthwise reciprocation of this shaft. The transmission means for this purpose consists in the provision of a vertical plate 83 slidably mounted in a yoke frame 84 having upper laterally extending portions 85 disposed upon the top of the bed plate and adapted to be secured thereon by means of set screws 86 and slots 87, which cooperating expedients incidentally provide means for adjusting the yoke frame in a direction transversely of the length of the bed plate. The vertical plate 83 is cut away at its upper end to provide opposing arms 88 carrying trunnions 89 whereon is provided a sleeve 90 in which the carrier shaft 64 is slidably fitted. Said vertical slide plate 83 is provided adjacent its lower end with a roller 91 having engagement in a cam slot 92 provided in the face of the disk cam 58.

The disk cams 79 and 58 with their respectively connected parts bear such relation to each other that the latch needle is reciprocated first at an upper level above the tassel ring, then moved downwardly to a lower level where it is reciprocated below the opposite or underneath face of the tassel ring. This peculiar combination of movements may in general be termed a three-motion actuation which is necessary in order to effect the application upon the tassel ring of cord covering convolutions and to chain-stitch such convolutions at the outer circumference of the ring.

Figure 6:
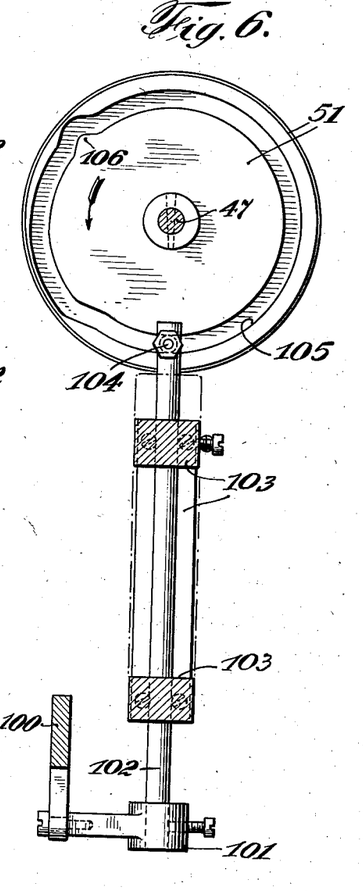
Fig. 6 is a detailed vertical section taken on the line 6—6 of Fig. 1, showing the cam means for the stripping mechanism.
Figure 7:
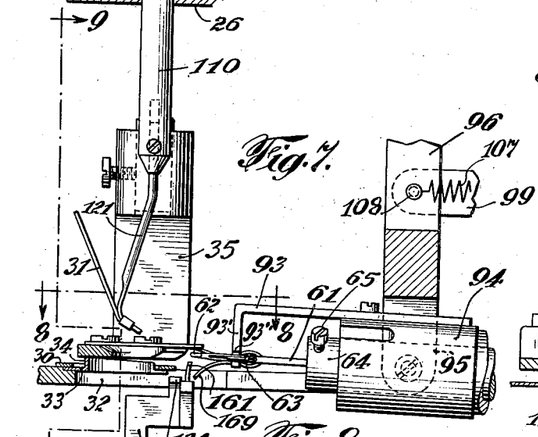
Fig. 7 is a sectional elevational view showing portions of the latch needle stitching mechanism, looper mechanism, stripping mechanism and work-feeding mechanism.
Figure 8:
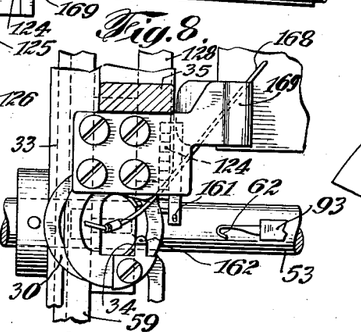
Fig. 8 is a detailed horizontal section taken on the line 8—8 of Fig. 7.
Figure 9:
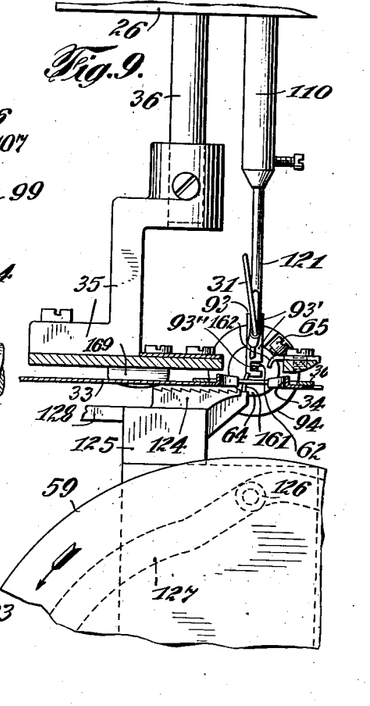
Fig. 9 is a detailed sectional elevation taken on the line 9—9 of Fig. 7.
Figure 10:
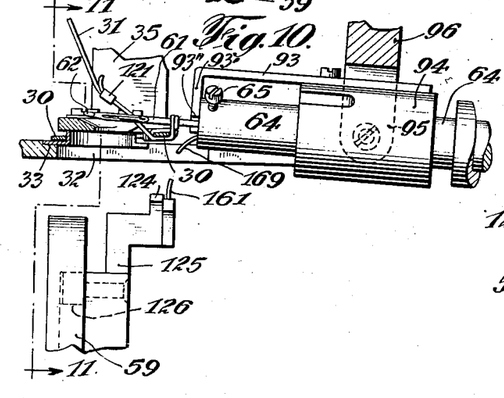
Fig. 10 is a view similar to Fig. 7, but showing the parts in different relative positions and with the needle in forward position above the work, and also showing a few stitches upon the work-piece.
Figure 11:
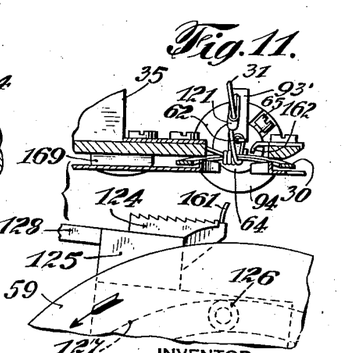
Fig. 11 is a vertical section taken on the line 11—11 of Fig. 10.

In connection with the latch needle carrier shaft 64 there is provided a needle loop stripping or casting-off mechanism which is operated from the disk cam 51 attached to the belt pulley 48. This mechanism comprises an arm 93 formed with a down-turned loop-stripping portion 93' having an opening 93" in which the needle with its latch is freely actuable. A sleeve 94 slidable upon the carrier shaft supports the arm 93. Pivotally connected with the sleeve 94 at the opposite sides thereof are the lower end portions 95 of a lever 96 the upper end of which has a pin and slot connection 977 with the overhanging arm. Fulcrumed upon the stud pin 74 is a bell crank lever 98 one end of which is connected by means of a link bar 99 with the lever 96, and the other end of which is pivotally connected through a link bar 100 with a head 101 furnished on the lower end of a vertical bar 102 having vertically sliding movement in a vertical guide frame 103. The upper end of said bar 102 is provided with a roller 104 which turns in a cam groove 105 provided in the face of the disk cam 51. Said cam groove 105 is characterized by having a triangular shaped portion 106 which serves as means for causing a sudden forward operation of the stripping device upon the latch needle so as to effect a quick casting off of loops gathered thereon and in such manner as will permit an uninterrupted three-motion actuation of the latch needle implement. For normally retaining the lever 96 and associated parts in proper adjusted position for their sudden actuation to effect a casting off of loops from the latch needle and as well for effecting a re-positioning of said lever 96 and its associated parts after each forward thrusting operation, a coiled spring 107 is provided, which spring has one end thereof connected with a post 108 on the lever 96 while the other end thereof is connected with a hook 109 applied to the upright standard 24.

The loop-forming and presenting mechanism comprises a vertical bar 110 the upper end of which is slidable in its longitudinal direction in a swivel member 111 carried by a block 112 mounted for adjustment as to position upon the top plate 37 of the head 26. Said vertical bar 110 also passes through and has movement in a slot or opening 113 provided in the head top plate 37; and it carries a member 114 equipped with a suitable roller having engagement with the outer cam slot 115 provided in the face of the disk cam 52, the purpose of this camming engagement being to give the vertical bar 110 vertical reciprocating movement. Also connected with the vertical bar 110 is a horizontal transversing bar 116 which carries a member 117 furnished with a roller 118 in engagement with the inner cam slot 119 of said disk cam 52. The transversing bar 116 is mounted for its transversing movement in a horizontal plane in suitable guide bearings 120 provided for the purpose in the head 26. The cam groove 119 and associated transversing bar 116 have for their purpose to effect a looping movement of the looper device 121 which is removably attached to the lower end of the vertical bar 110 and extends downwardly therefrom. Said looper device 121 is angularly inclined towards the latch needle, and has an opening or eye therein through which the cord 31 is passed and fed in order to carry through the desired loop forming, presenting and applying operations in connection with the latch needle. The cord for the looper device is drawn from the supply bobbin 29 over a fixed guide member 122 applied to the top of the spindle 28, and also over a suitable movable spring-tensioned guide member 123 supported upon the head 26.

The operation of the looper mechanism is so synchronized with the three-motion actuation of the latch needle that the looper device will present a formed loop to the latch needle hook each time the latch needle retracts from its forward terminal of movement above the tassel ring, and will also present a formed loop to the latch needle hook each time the latch needle retracts from its forward terminal of movement below the tassel ring; and this synchronization is also such that the looper device will move up and down in correlation with the up and down movements of the latch needle implement, all in such manner that these two mechanisms in cooperating synchronism will apply convolutions of the cord transversely around the tassel ring and in such manner that the latch needle will loop stitch the convolutions together. In this connection it is to be noted that the looper device in moving from and to the two loop presenting localities passes through the interior of the tassel ring.

Figures 3, 3A:
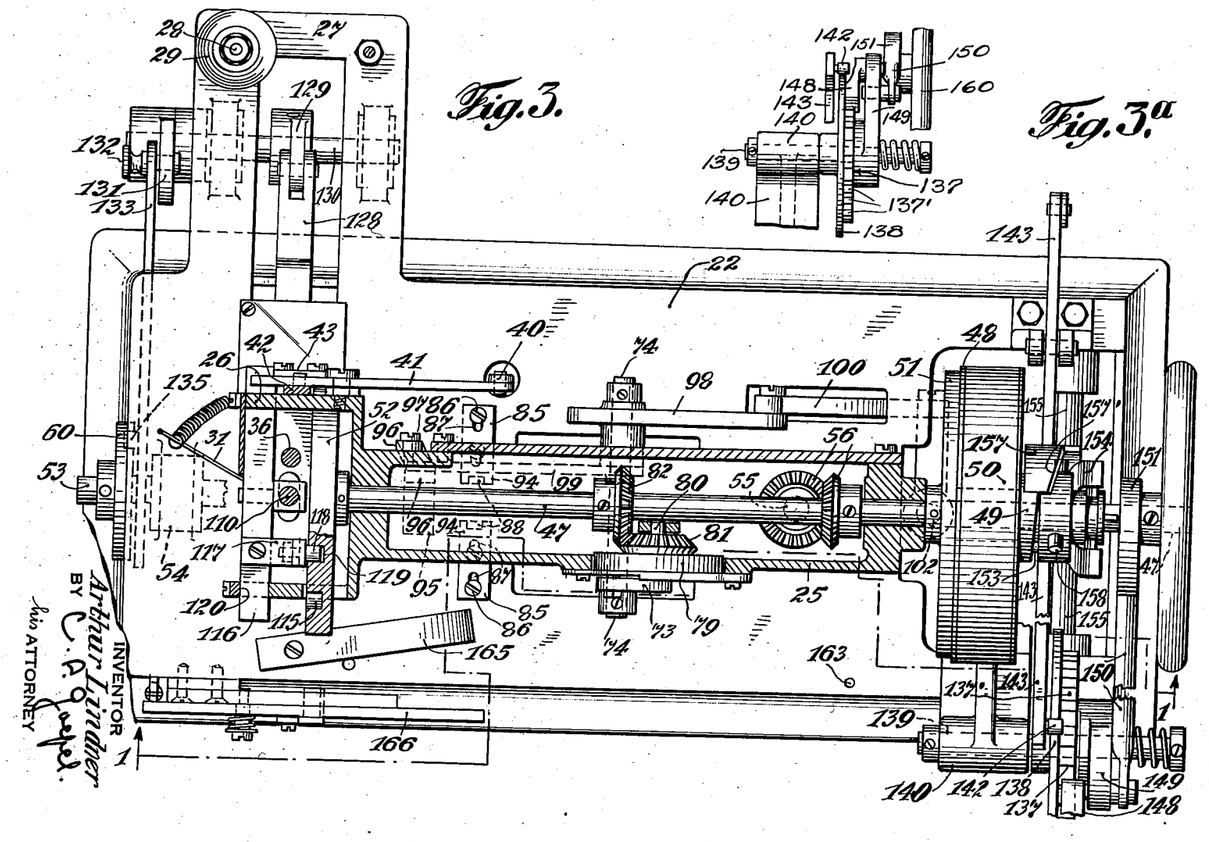
Fig. 3 represents a top plan view and section taken substantially on the line 3—3 of Fig. 2.
Fig. 3a is a fragmentary elevational view of the stop disk and ratchet mechanism for the self-setting stop motion control.

Feeding mechanism is provided whereby intermittently in relation to the application of the cord convolutions upon the tassel ring and the loop stitching of the same, to feed or circularly move the tassel ring around the throat plate flange 34. The feed mechanism for this purpose comprises a feed dog 124 applied to a feed dog carrier 125 which is equipped with a roller 126 operating in a cam slot 127 provided for the purpose in the disk cam 59. The purpose of this camming action engagement is to give the feed dog up and down movement with respect to the tassel ring. Attached to the feed dog carrier 125 is an arm 128 the outer end of which is pivotally united with a projection 129 on a rock shaft 130 mounted in suitable bearings on the rear extension 27 of the bed. Also attached to the rock shaft 130 is a slotted arm 131 in which is engaged a pin 132 projecting laterally from the outer end of an arm 133. The inner end of the arm 133 has lost-motion connection through a slot 134 with the shaft 53 and carries a roller 135 which is in camming engagement with a cam slot 136 provided in the face of the disk cam 60. Through this chain of transmission parts the disk cam 60 causes a transverse reciprocation of the feed dog 124. Through the provision of this mechanism the feed dog is given in general a four-motion actuation consisting of a forward transverse movement well below the work-piece, then an upward movement to engage it with the work-piece, then a backward transverse movement while in engagement with the work-piece whereby to effect a circular feeding movement of the latter and then a downward movement from the work-piece. In the present instance, this four-motion actuation of the feed dog is so related to the application of cord convolutions thereon and the loop-stitching of the same that each time a convolution has been applied transversely around the work-piece and loop-stitched in place the backward transverse movement of the feed dog will take place so as to move the work-piece a distance substantially equal to the thickness of the cord strand so that the next succeeding convolution can be applied in place upon the work-piece, it being understood that in the present instance, it is desired to cover the work-piece with a single layer covering composed of adjacent convolutions chain-stitched together after the fashion of woven work. The machine of my invention also involves a self-setting stop motion control whereby automatically to predetermine the exact number of loop convolutions and chain stitches which are necessary to provide a complete covering for a particular size tassel ring. Thus, for instance, if the tassel ring is of such size that thirty-four convolutions and loop stitches of a cord of a particular size will properly cover the tassel ring in its entirety, then I employ a control ratchet 137 having thirty-four ratchet teeth 137' on its circumference. This ratchet wheel together with a stop motion disk 138 which is fixed thereto is mounted to turn upon a shaft 139 suitably supported in a bracket 140 extending upwardly from the bed plate. The stop motion disk is provided with a circumferential slot 141 adapted to receive therein a roller 142 carried by a lever 143 fulcrumed at 144 upon an upright 145 extending upwardly from the bed plate. The rear end of the lever 143 is pivotally engaged at 146 with a foot-treadle connecting bar 147. In this arrangement, by drawing the connecting bar 147 downwardly (through the proper actuation of the foot-treadle, not shown) the forward end of the lever 143 will be elevated sufficiently to withdraw the roller 142 from the notch 141 so that the roller will thence turn upon the circumference of the stop motion disk 138. For actuating the ratchet wheel 137, I provide a pawl 148 attached to a crank arm 149 with which is pivotally connected an eccentric arm 150 which is actuated from an eccentric device 151 applied to the main shaft 47. Also mounted upon the main shaft 47 is a clutch part 152 which cooperates with the clutch part 49 attached to the pulley 48, the clutch part 152 having pins 153 adapted to be engaged and disengaged with the clutch part 49 accordingly as the said clutch part 152 is moved axially of the shaft 47. Said clutch part 152 is normally moved into clutching engagement with the part 49 by means of a clutch shift lever 154 the lower end of which is pivoted at 155 to the base 23, there being a pull spring 156 connected with shift lever 154 and tending normally to close the clutch. Now the lever 143 carries a throw-out cam 157 having a camming edge 157' with which a pin 158 projecting from the clutch part 152 is adapted to be engaged in order to disconnect the clutch against the pull of the spring 156. Through this arrangement, each time the roller 142 drops into the notch 141, owing to the influence of a pull spring 159 attached to said lever 143, the throw-out cam 157 will be drawn into position whereby to engage the pin 158 and thereby disconnect the clutch and bring the parts to rest. The number of teeth on the control ratchet equaling the number of convolutions to be produced upon the work-piece and the parts being arranged so that the roller 142 will drop into the notch 141 immediately upon the application of the last convolution with its chain-stitch, all of the mechanisms of the machine will be brought to rest on the completion of the last stitch in the covering upon the tassel ring.

It will be recognized that the pull spring 159 attached to lever 143 normally urges the latter in a direction to maintain the roller 142 upon the circumference of the turning, stop motion disk 138, and, when said roller drops into notch 141, that the lever 143 will be immediately actuated in a direction that establishes the cam 157 where it will be engaged by clutch pin 158 whereby to effect unclutching action of the keyed clutch part 152, with the result that the pulley 48 will thence run free on the main shaft. As the clutch is forced out, the hand-wheel 160 may be grasped to bring the main shaft and hence the various mechanisms to a quick stop. To start the machine again it is necessary through proper actuation of the rod 147 (preferably performed from a foot-treadle) to raise lever 143, lifting the roller 142 from the notch so that it will again rest on the circumference of the stop motion disk 138, which action automatically results in re-establishing the clutching engagement between the clutch parts 152 and 49 whereby to rotate the main shaft with the driving pulley 48. In order to employ cords or threads of different sizes or gauges and work-pieces of different sizes, the ratchet 137 with its stop motion disk may be removed and another ratchet applied which will have teeth equal in number to the number of strand convolutions requisite to cover the work-piece.

Figure 12:
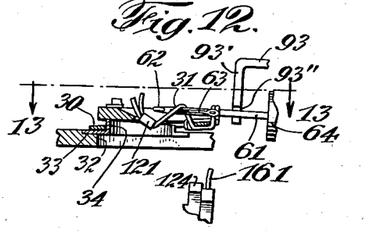
Figure 13:
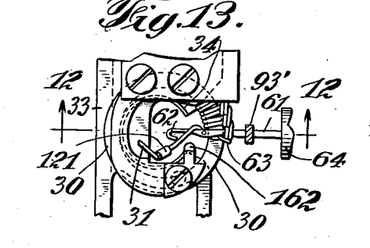
Figure 14:
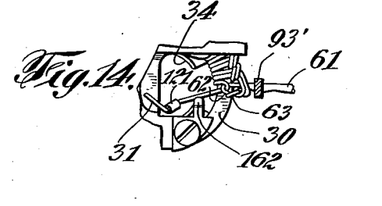
Figure 15:
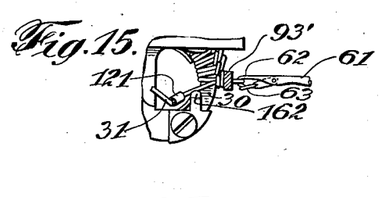

Referring more particularly to Figs. 12 and 13, it will be noted that when the latch needle is in its forward position above the work, the looper device operates to form a loop in a direction over the needle from the rear to the front thereof whereby to present the loop to the hook of the needle. At this time it will be noted that the needle carries upon its shank and under its latch two previously formed loops. After the needle picks up the loop presented by the looper device, such picked up loop during the retracting action of the needle is drawn through the two previously formed loops which, during this retracting action of the needle are stripped off the needle (the pull of the loops actuating the needle latch in the usual way for this purpose) by the actuation of the stripper device. In this way, on each retracting movement of the needle at its upper level a chain-stitch is produced on the circumference of the tassel ring. In connection with the production of this chain-stitch the feed dog is actuated in its upper position and toward the rear of the machine so as to engage the work and move the tassel ring a distance equal to the thickness of the cord. In conjunction with this movement, a projection or land 161 upstanding from the feed dog comes into engagement with the loop stitch and moves the same and its connected convolution into close contact against the previously formed loop stitch and its convolution. Therefore as each loop stitch is completed, it with its connected convolution is moved into place upon the work-piece into close and firm engagement with its predecessor.

Figure 16:
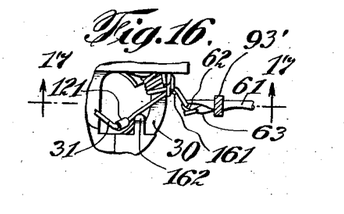
Figure 17:
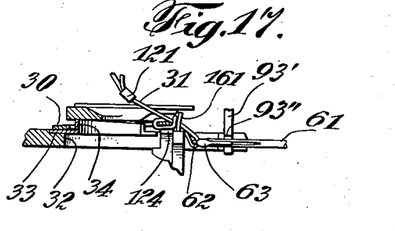
Fig. 17 is a vertical section on the line 17—17 of Fig. 16.
Figures 18, 19, 20, 21:
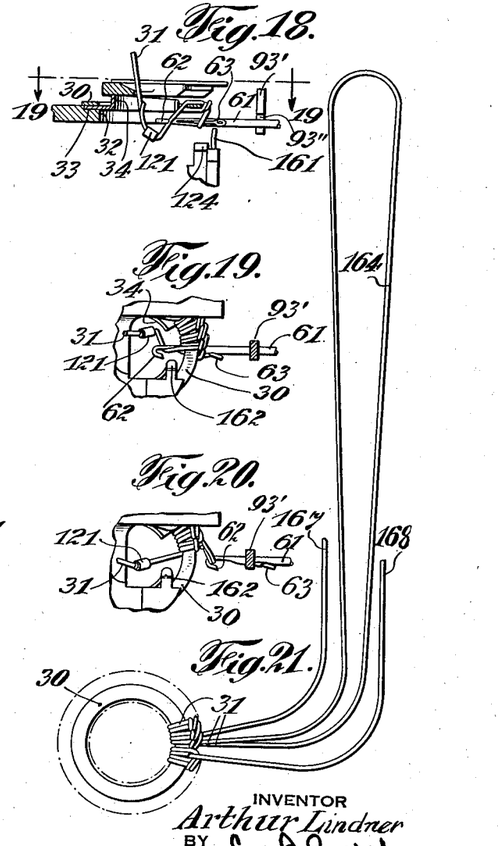

Referring to Figs. 16 and 17, it will be seen that after the production of the loop stitch, the needle descends carrying in its hook the loop which was picked up at the upper level and which was drawn through the two cast-off loops; and further that in conjunction with this descending movement of the needle the looper device also descends at the opposite edge of the work-piece so as to carry its cord downwardly across such opposite edge. As shown in Figs. 18 and 19, when the needle advances below the work-piece the loop which was in its hook is slipped onto the latch and at the forward position of the needle the looper device presents another loop to the hook by swinging the cord under and upward around the needle, this movement being the reverse of that shown in Figs. 12 and 13 pertaining to the presentation of a loop at the upper level. When the needle picks up its loop at its lower level, it will then have two loops in its bill, as shown in Fig. 20. After this, the needle and looper move upwardly again, and as the needle performs its forward stroke the two loops are slipped from the hook into a position in which the latch closes thereon, so that when the needle arrives at its forward position it is in condition again to pick up a loop at the upper level. From the upper level the cycle is then repeated for the laying and stitching of another convolution of the cord upon the ring. Mounted upon the bed plate adjacent the opening of the throat plate and in a position to be crossed by the needle latch is a tongue 162 the purpose of which is to engage and positively close the latch on the loops in the event the latch does not itself, owing to the action of the needle, properly close upon the loops. This tongue is merely a safety device for this purpose and is a requisite only where cords of large size or gauge are employed. It is found in practice that it is not needed where threads or cords of relatively small thickness are employed.

After the covering has been completed, the last convolution and loop stitch being made, and the machine stopped, the loop held in the needle hook is removed from the needle hook by a manually operated picker device, not shown, and expanded, the cord for this purpose being supplied through the looper and from the bobbin, until the loop thus picked up can be engaged over a post 163, the distance of which from the work-piece is substantially equal to the length of pull cord that is to support the tassel ring pendant from the window shade. Such an expanded loop is indicated at 164 in Fig. 21. After this, the strand which connects with the loop 164 and extends through the looper to the bobbin is picked and extended underneath a spring holder 165 and thence underneath a cutting knife 166 which is moved downwardly so as to sever the cord and produce thereby a loose end 167. The opposite loose end 168 which, at the beginning of the covering operation was engaged under a spring holder 169 is then, by hand, taken with the loose end 167 and tied in a knot adjacent the inception of the large loop 164 and against its loop stitch whereby to prevent unroving of the covering.

By the machine of my invention, I am enabled to cover tassel rings and other devices at most rapid speed, producing a neat-appearing and durable covering that is ornamented with the chain-stitches. The machine being automatic, unskilled labor with little or even with no previous experience in covering articles, can be quickly taught to operate the machine and to produce coverings that are more uniform and attractive than hand-made coverings.

It will be understood that the invention is not limited to the production of coverings on tassel rings, for it may be used to cover various kinds of cores and articles. Moreover, the terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

As many changes could be made in the above construction and many apparently widely different embodiments of this invention could be made without departing from the scope thereof, it is intended that all matter contained in the above description or shown in the accompanying drawings, shall be interpreted as illustrative and not in a limiting sense.

I claim:—

1. A plurality of separately actuated mechanisms for a core covering machine, the latter comprising means for intermittenly moving the core in a plane a distance substantially equal to the thickness of the covering strands, one of said mechanisms including a latch needle having various movements relative to the core, including movements to and from opposite sides of the core in a plane substantially at right angles to the plane of movement of the core, for applying a strand of covering material around the core between the intermittent movements thereof, and another of said mechanisms comprising a looper adapted to form strand loops and present the same to the needle and effective for such purpose through the plane of movement of the needle and at the opposite sides of the core.

2. In a machine for covering a core, the combination with a reciprocating guide, of a needle carrier with a needle connected with the guide to be moved therewith, the connection comprising a pivot to allow relative movement of the carrier with the needle, means for moving the carrier with its needle in the direction of the length thereof, and separate means for simultaneously moving the carrier with its needle and on the pivot of the carrier transversely a distance at either side from and to the path of the longitudinal movement thereof, the relation of the two moving means being such as to alternate and combine the transverse movements from and to either side with the complete reciprocations.

3. In a looper mechanism for a core-covering machine, the combination with an elongated oscillatable mounting member, of a looper connected with said member to oscillate therewith, a rotating cam having outer and inner cam grooves, a part on the member engaging the outer groove to give the member and looper longitudinal reciprocating movement, and a guided transversing element on the member carrying a part engaging the inner groove to give the member and looper transverse reciprocating movement for forming a loop during the longitudinal reciprocation thereof, the relation of the two parts and cam grooves being such as to give a loop forming transverse movement at substantially each of the two terminals of movement of every complete longitudinal reciprocation.

4. In a core covering machine, the combination of a stationary holder for supporting a movable core to be covered, strand applying and stitching mechanism, and looper mechanism for presenting strand loops to the applying and stitching mechanism, said mechanisms having mutual cooperation relatively to the holder and about the movably supported core, main operating means, and separately arranged independently operative means each connected with and controlled by the main operating means for operating said mechanisms in predetermined timed relation and coacting to apply and loop stitch the strand in successive strand convolutions around the core, and means operated by the main operating means for moving the core substantially the thickness of each completed strand convolution for the application of the next succeeding strand convolution.

5. In a ring core covering machine, the combination of cord feeding mechanism, loop presenting mechanism, means including a latch needle implement for applying and loop-stitching the presented loops upon the core, means for operating said feeding mechanism, loop-presenting mechanism, means connected therewith for operating said needle implement, means controlled by the operation of the operating means for positively moving the core circularly to provide for the application of the cord convolutions in regular succession about the core, and a stop motion control controlling the operation of the operating means to limit the number of loop stitches, the latter being self-setting at the limit of the number of cord convolutions to be applied to the core, said needle implement and loop-presenting mechanism being operated transversely about the exterior of the core and through the interior thereof, respectively, to apply cord convolutions transversely about the core.

6. In a core covering machine, the combination of a three-motion reciprocating action latch needle strand applying and loop-stitching mechanism, having two of its terminals of movement in two spaced parallel planes alternately in such planes, and means for carrying and presenting loops to said mechanism comprising reciprocating looper mechanism reciprocating at right angles to said planes and also operating in each of said planes traverse of said terminals of movement of the needle so as to present a loop to the needle in conjunction with each of said terminals of movement of the needle alternately in the two planes, the third of the three-motion reciprocating actuations of the needle being accomplished between the traverse operations of the looper mechanism and while the latter moves from one to the other of the two planes.

7. A core-covering machine comprising, in combination, applying and stitching mechanism including a latch needle having reciprocating movement transversely across one side of the core and in respect to opposite faces thereof for applying strands of material and loop stitching the same, and coacting looper mechanism having reciprocating movement at the other side of the core to present strand loops to the needle in relation to the opposite faces of the core, said parts being effective in continued operation to cover the core with successive transversely applied strand convolutions each of which is loop-stitched by the needle.

8. A core-covering machine comprising, in combination, applying and stitching mechanism including a latch needle having reciprocating movement including lateral oscillation alternately from side to side to alternately pass adjacent the opposite faces of the core for applying thereto strand material and adapted at one point to lopp-stitch the material being applied, looper mechanism having reciprocating and looping movement to present a strand loop to the needle adjacent each of the opposite faces of the core, stationary means for retaining the core during the application of the strand material thereto, and means for moving the core on the stationary means in timed relation to the completion of the loop stitches.

9. A core-covering machine comprising, in combination, applying and stitching mechanism including a latch needle having reciprocating movement transversely across one side of the core and in respect to the opposite faces thereof for applying strand material to the core and adapted for such purpose to gather loops for chain-stitching the strands being applied, means for stripping the needle-gathered loops to cast off the chain-stitching at one point on the core, and looper mechanism reciprocating as a strand carrier to and from the opposite faces of the core and having at each of the opposite faces thereof a looping movement for forming a loop to be seized by the needle.

10. In a core covering machine which includes a latch needle and a looper, a stationary holder for carrying a core to be covered, means for reciprocating and guiding the latch needle in its longitudinal direction alternately across the top and bottom faces of the core on the stationary holder, means for reciprocating the looper, vertically through the planes of the top and bottom faces of the core and also laterally from its vertical path adjacent each of such faces to cause the looper to present a cord loop to the needle when the latter operates across each face, said needle and looper coacting to apply cord convolutions transversely around the supported core, and means for intervally moving the core on the holder to provide for the regular application on the core of the cord convolutions.

11. A core covering machine having a holder in the form of a hollow stationary collar having a throat opening in its side wall and adapted to retain a ring core exposed at the throat opening, a latch needle operated through the throat opening, alternately above and below the core, a looper operated through the hollow interiors of the collar and core adapted to present a cord loop to the needle alternately above and below the core, said needle and looper coacting to apply a cord convolution transversely around the core at said throat opening.

12. In a core covering machine, the combination with a stationary collar having a throat opening and adapted to support a ring core exposed at said opening and having circular movement, of a carrier mounted for reciprocation towards and away from the collar, a latch needle attached at its shank end by a pivot to said carrier to reciprocate therewith, and actuable means attached to said carrier for swinging and guiding it to pass through said throat opening alternately above and below said core, and means for presenting a cord loop to said needle above and below the core.

13. In a core covering machine, a stationary member for supporting a core to be covered, cord applying and loop stitching mechanism, means for reciprocating the same to and from positions at opposite faces of the core and across the front thereof, a cord looper mechanism, means for moving the same to and from positions at opposite faces of the core and for actuating the same at such faces in mutuality with respect to the needle to present a loop to the needle at each of such positions, such mechanisms between the face positions functioning transversely of the core, respectively at opposite sides thereof whereby to pass the cord transversely around the core.

14. In a core covering machine, in combination, a cord applying mechanism comprising a reciprocating latch needle and a cooperating loop presenting element, means for reciprocating the needle and element in their longitudinal direction in planes substantially at right angles to each other and while so moving them to give them lateral movement from their respective planes, the needle under its lateral movement being moved alternately to pass transversely across opposite faces of the core to be covered by the cord, and said element under its lateral movement being moved on the bias with respect to the face transverse movement of the needle and at either face, which movements of the needle and element are so related to each other that the element presents a cord loop to the needle at either face of the core to be covered.

15. In a core covering machine, a stationary member for supporting a core to be covered, cord applying and loop stitching mechanism, means for reciprocating the same to and from positions at opposite faces of the core and across the front thereof, cord looper mechanism, means for moving the latter to and from position at opposite faces of the core and for actuating the same at such faces in mutuality with respect to the cord applying and loop stitching mechanism to present a loop to such mechanism at each of such positions, such mechanisms between said face positions functioning transversely of the core, respectively at opposite sides thereof whereby to apply the cord transversely around the core in successive convolutions, means effective to move the core by engaging one or more of the completed convolutions thereon, which means is ineffective to perform such function while a convolution is being applied.

16. A core covering machine comprising a base, a core holder mounted thereon, said holder comprising a stationary member on which movably to mount the core and having a throat opening in which the core is exposed, a reciprocating member radially disposed to said opening, a needle having pivotal connection with said member and means for moving the needle up and down so that it will pass through said opening alternately above and below the core, means for presenting cord loops to the needle above and below the core, means for moving the core, a main operating shaft, and means controlled by said shaft for operating said member, said needle moving means, said loop presenting means and said core moving means in predetermined timed relation.

17. In a core covering machine, the combination of relative movable mechanisms coacting to loop cord convolutions around a core, a holder on which the core is mounted for movement and having a throat opening for exposing the core, one of said mechanisms comprising a latch needle having movement in alignment with said opening across the front side of the core and through said opening alternately above and below the bottom faces of the core, another mechanism comprising a looper having movement at the rear side of the core and having further movements in which loops are presented to the needle at the top and bottom faces of the core, means for moving the core after the application thereon of each cord convolution to bring fresh portions of the core into exposure at the throat plate, and means in connection with the last said means for pressing the completed convolutions together.

18. In a machine of the character described, a holder for an element to be sheathed, a crocheting hook, mechanism cooperating with the hook to crochet a cord about said element, said mechanism including means for feeding the element into position by acting on said cord to force that part of the free cord close to said element against the endmost completed stitch on said element and to feed said element after the formation of each stitch and driving means for said hook and said mechanism.

ARTHUR LINDNER.